US008435054B2

(12) United States Patent
Liu (10) Patent No.: US 8,435,054 B2
(45) Date of Patent: May 7, 2013

(54) ELECTRONIC DEVICE WITH PIVOTAL COVER

(75) Inventor: Pei Liu, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 223 days.

(21) Appl. No.: 13/013,833

(22) Filed: Jan. 26, 2011

(65) Prior Publication Data

US 2012/0028485 A1    Feb. 2, 2012

(30) Foreign Application Priority Data

Jul. 27, 2010  (CN) .......................... 2010 2 0272717

(51) Int. Cl.
*H01R 13/44* (2006.01)
(52) U.S. Cl.
USPC ........................................................ 439/142
(58) Field of Classification Search .................. 439/142; 16/342; 720/647
See application file for complete search history.

(56) References Cited

U.S. PATENT DOCUMENTS

| | | | | | |
|---|---|---|---|---|---|
| 4,093,331 | A | * | 6/1978 | Molchan ........................ | 439/144 |
| 4,478,005 | A | * | 10/1984 | Mundschenk ................. | 49/388 |
| 4,607,301 | A | * | 8/1986 | Iizuka ............................ | 360/93 |
| 5,050,211 | A | * | 9/1991 | Dortu et al. ................... | 379/438 |
| 5,199,888 | A | * | 4/1993 | Condra et al. ................ | 439/142 |
| 5,385,479 | A | * | 1/1995 | Okada .......................... | 439/144 |
| 5,628,055 | A | * | 5/1997 | Stein ........................... | 455/575.1 |
| 5,679,013 | A | * | 10/1997 | Matsunaga et al. ........... | 439/144 |
| 5,724,226 | A | * | 3/1998 | Ruch et al. ................ | 361/679.41 |
| 5,731,683 | A | * | 3/1998 | Nakanishi ...................... | 320/111 |
| 5,769,646 | A | * | 6/1998 | Cavello et al. ................ | 439/136 |
| 5,884,947 | A | * | 3/1999 | Lopez et al. .................. | 292/198 |
| 6,002,581 | A | * | 12/1999 | Lindsey .................... | 361/679.55 |
| 6,038,125 | A | * | 3/2000 | Anzai ........................... | 361/609 |
| 6,222,726 | B1 | * | 4/2001 | Cha ........................ | 361/679.32 |
| 6,267,608 | B1 | * | 7/2001 | Yagi .............................. | 439/142 |
| 6,351,388 | B1 | * | 2/2002 | Jenkins et al. ................ | 361/730 |
| 6,554,495 | B1 | * | 4/2003 | Zhu et al. ........................ | 385/92 |
| 6,631,276 | B1 | * | 10/2003 | Yamaguchi et al. .......... | 455/561 |
| 6,679,710 | B2 | * | 1/2004 | Saito et al. .................... | 439/142 |
| 6,705,688 | B2 | * | 3/2004 | Tobishima .................. | 312/223.1 |
| 6,708,370 | B2 | * | 3/2004 | Shih et al. ....................... | 16/332 |
| 6,757,160 | B2 | * | 6/2004 | Moore et al. ............. | 361/679.55 |
| 6,964,576 | B2 | * | 11/2005 | Crutchfield ................... | 439/142 |
| 7,016,492 | B2 | * | 3/2006 | Pan et al. .................. | 379/433.13 |
| 7,058,435 | B2 | * | 6/2006 | Yamazaki ................. | 455/575.8 |
| 7,123,487 | B2 | * | 10/2006 | Saito et al. .................... | 361/801 |
| 7,137,834 | B2 | * | 11/2006 | Son ............................... | 439/136 |
| 7,150,635 | B2 | * | 12/2006 | Ostmoe et al. ............... | 439/135 |
| 7,350,219 | B2 | * | 3/2008 | Liao et al. ..................... | 720/647 |
| 7,425,141 | B2 | * | 9/2008 | Kanayama et al. ........... | 439/135 |

(Continued)

*Primary Examiner* — Neil Abrams
(74) *Attorney, Agent, or Firm* — Altis Law Group, Inc.

(57) ABSTRACT

An electronic device includes an enclosure, a connector, a connector cover, and a resisting member. The enclosure defines at least one opening. The connector is disposed in the enclosure and corresponding to the at least one opening of the enclosure. The connector cover covers the opening to protect the connector and includes pivot shaft. The pivot shaft is rotatably connected to the enclosure. The resisting member elastically resists against the connector cover. The resisting member may be formed by a spring biased block that presses in an end of the pivot shaft to maintain the cover in open or closed position. A restricting member may be located in the opening to limit cover rotation in both open and closed positions.

11 Claims, 7 Drawing Sheets

U.S. PATENT DOCUMENTS

| | | | |
|---|---|---|---|
| 7,495,712 B2* | 2/2009 | Takeda | 348/836 |
| 7,510,250 B2* | 3/2009 | Lin et al. | 312/223.2 |
| 7,611,371 B2* | 11/2009 | Guo | 439/367 |
| 7,687,711 B2* | 3/2010 | Kutaragi et al. | 174/50 |
| 7,704,085 B1* | 4/2010 | Chang | 439/137 |
| 7,857,653 B2* | 12/2010 | Fujita et al. | 439/367 |
| 7,866,991 B2* | 1/2011 | Liu | 439/136 |
| 8,107,227 B2* | 1/2012 | Long et al. | 361/679.01 |
| 8,186,726 B2* | 5/2012 | Zuo | 292/57 |
| 8,199,464 B2* | 6/2012 | Zuo et al. | 361/679.01 |
| 8,199,470 B2* | 6/2012 | Yang | 361/679.02 |
| 8,218,314 B2* | 7/2012 | Yang et al. | 361/679.58 |
| 8,254,138 B2* | 8/2012 | Ouyang | 361/752 |
| 8,337,222 B2* | 12/2012 | Hung et al. | 439/138 |
| 2002/0064981 A1* | 5/2002 | Yu et al. | 439/135 |
| 2005/0287853 A1* | 12/2005 | Kim et al. | 439/137 |
| 2006/0261605 A1* | 11/2006 | Ku et al. | 292/251.5 |
| 2007/0214605 A1* | 9/2007 | Tu | 16/342 |
| 2008/0055843 A1* | 3/2008 | Ke et al. | 361/686 |
| 2012/0069518 A1* | 3/2012 | Hsu et al. | 361/679.58 |
| 2012/0162872 A1* | 6/2012 | Liang | 361/679.01 |

* cited by examiner

ELECTRONIC DEVICE WITH PIVOTAL COVER

BACKGROUND

1. Technical Field

The present disclosure relates to electronic devices, and in particular to an electronic device having protected external connectivity.

2. Description of Related Art

Hardware interfaces such as universal serial bus (USB) ports often provide electronic device connection to portable storage devices, external players, or other electronic devices, for transferring data therebetween. A connector cover is favorable to have for protecting the data interface when not in use.

A conventional connector cover is often a single detachable element. When the hardware interface is in use, the connector cover is temporarily detached from the hardware interface, and thus may be lost or misplaced, resulting in the connector being unprotected when not in use.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
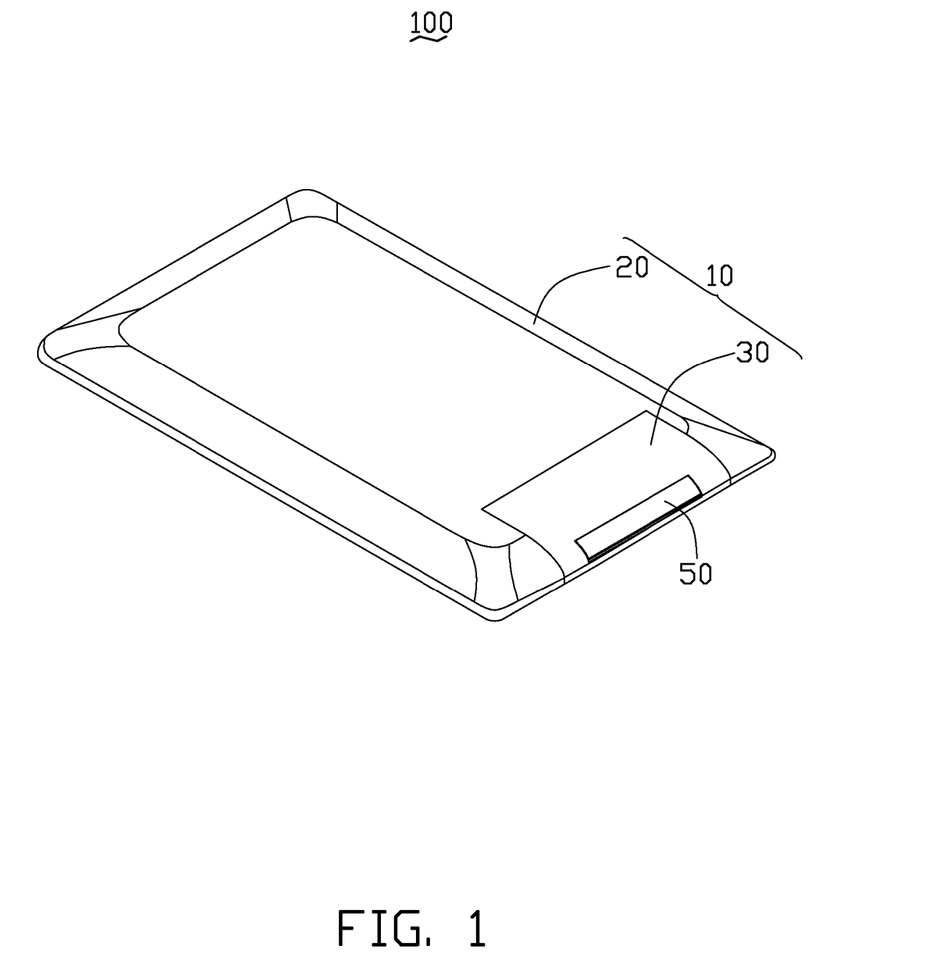
FIG. 1 is an assembled, isometric view of one embodiment of an electronic device including an enclosure, a resisting member, a resilient member, and a connector cover, in which the enclosure includes a main body and a cover.
Figure 2:
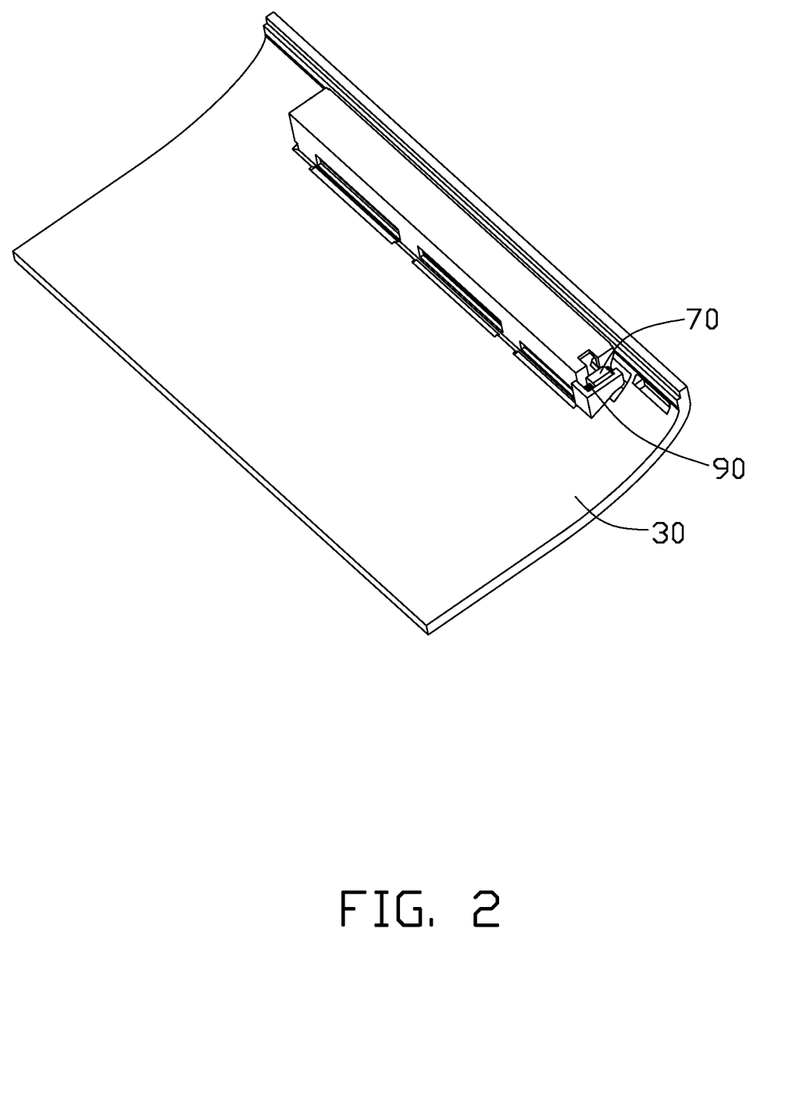
FIG. 2 is an assembled, isometric view of the cover, the resisting member, the resilient member and the connector cover.

The disclosed electronic device may be a personal digital assistant (PDA), a MP3 player, a digital photo frame, a liquid crystal display monitor, or other electronic device. Referring to FIG. 1 and FIG. 2, an embodiment of an electronic device 100 includes an enclosure 10, a connector cover 50, a resisting member 70, and a resilient member 90. The enclosure 10 includes a main body 20 and a cover 30 installed with the main body 20.

Referring also to FIGS. 3 through 6, the cover 30 includes a first receiving portion 32, a second receiving portion 34, and a restricting member 36. The first receiving portion 32 is depressed from an outer surface of an end of the cover 30. The first receiving portion 32 includes a first sidewall 322, a second sidewall 324, a third sidewall 326, and a fourth sidewall 328. The first sidewall 322 and the second sidewall 324 are a plurality of substantially rectangular boards. The first sidewall 322 extends from a side of the second sidewall 324 away from the end of the cover 30 from which the first receiving portion 32 is depressed. The third sidewall 326 is positioned at an end of the first sidewall 322 and the second sidewall 324. The fourth sidewall 328 is positioned at an end of the first sidewall 322 and the second sidewall 324, that is opposite to the third sidewall 326. The first sidewall 322 defines at least one opening 329. The electronic device 100 further includes at least one connector 332 received in the enclosure 10, and the connector 332 corresponding to the at least one opening 329. The third sidewall 326 defines a shaft hole 3262. The second sidewall 324 and the fourth sidewall 328 cooperatively define a notch 3282 extending from an end of the second sidewall 324 adjacent to the fourth sidewall 328. The fourth sidewall 328 defines a pivot hole 3284 corresponding to the shaft hole 3262, and the pivot hole 3284 communicates with the notch 3282.

The second receiving portion 34 is positioned inside of the cover 30 and adjacent to the fourth sidewall 328. The second receiving portion 34 is substantially U-shaped, and includes a first plate 342, a second plate 344, and a third plate 346. The second plate 344 is substantially parallel to the fourth sidewall 328. The first plate 342 and the third plate 346 interconnect the second plate 344 and the fourth sidewall 328. The notch 3282 and the pivot hole 3284 communicate between the first receiving portion 32 and the second receiving portion 34.

The restricting member 36 is substantially a block fixed to a surface of the third sidewall 326 facing the fourth sidewall 328. The restricting member 36 is positioned between the shaft hole 3262 and the first sidewall 322. The restricting member 36 includes a first restricting portion 362 and a second restricting portion 364. The first restricting portion 362 extends to the second sidewall 324. The second restricting portion 364 angles from an end of the first restricting portion 362 away from the second sidewall 324. The second restricting portion 364 includes a restricting surface 3642 at a side of the second restricting portion 364 away from the second sidewall 324.

Figure 3:
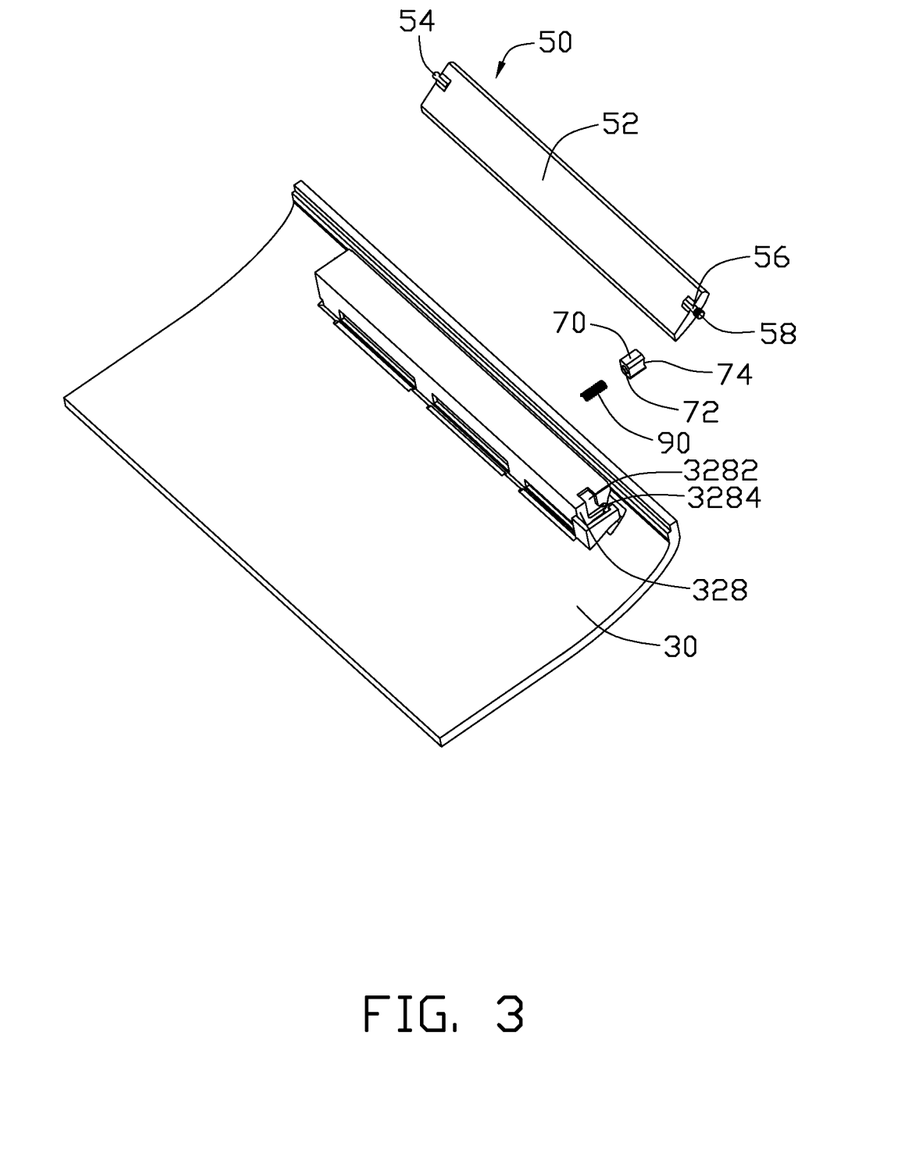
FIG. 3 is an exploded, isometric view of the cover, the resisting member, the resilient member and the connector cover of FIG. 1.
Figure 4:
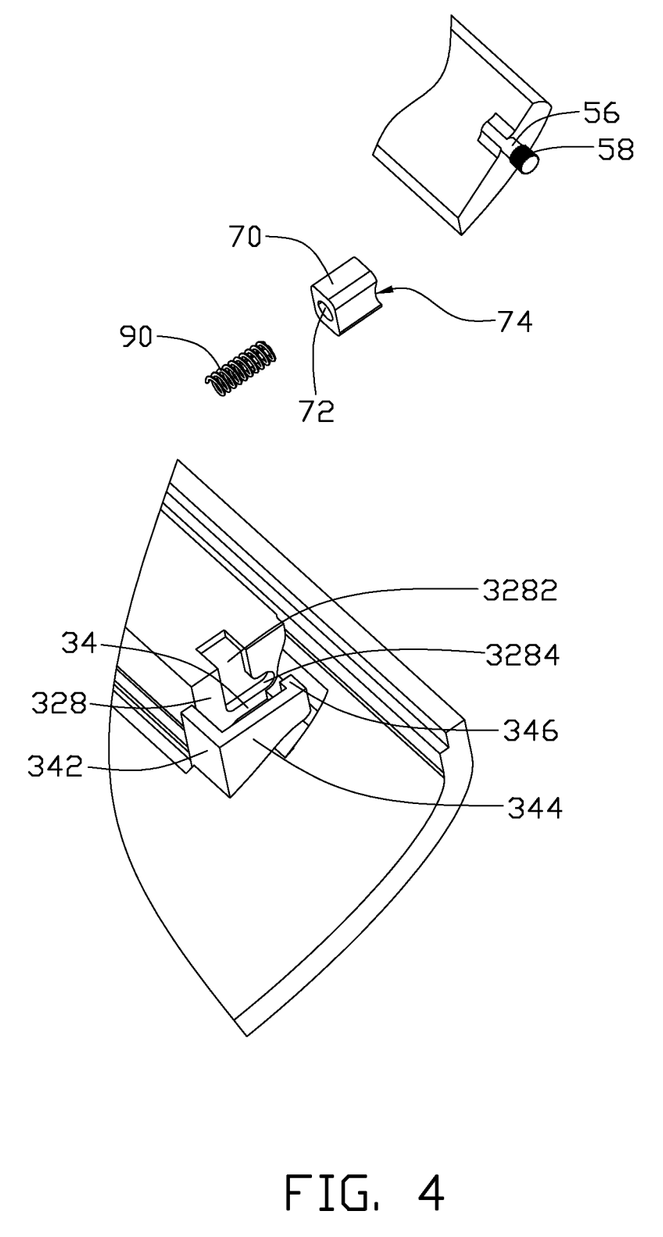
FIG. 4 is a partial enlarged view of the cover, the resisting member, the resilient member and the connector cover of FIG. 3.
Figure 5:
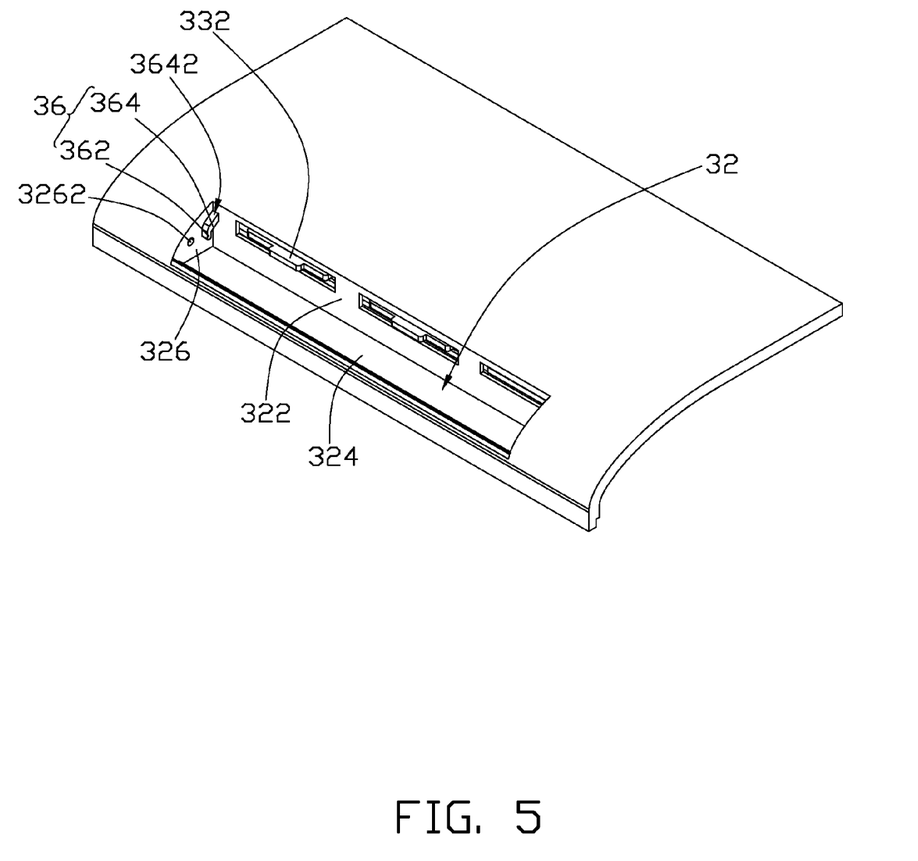
FIG. 5 is an isometric view of the cover of FIG. 3, but view from another aspect.
Figure 6:
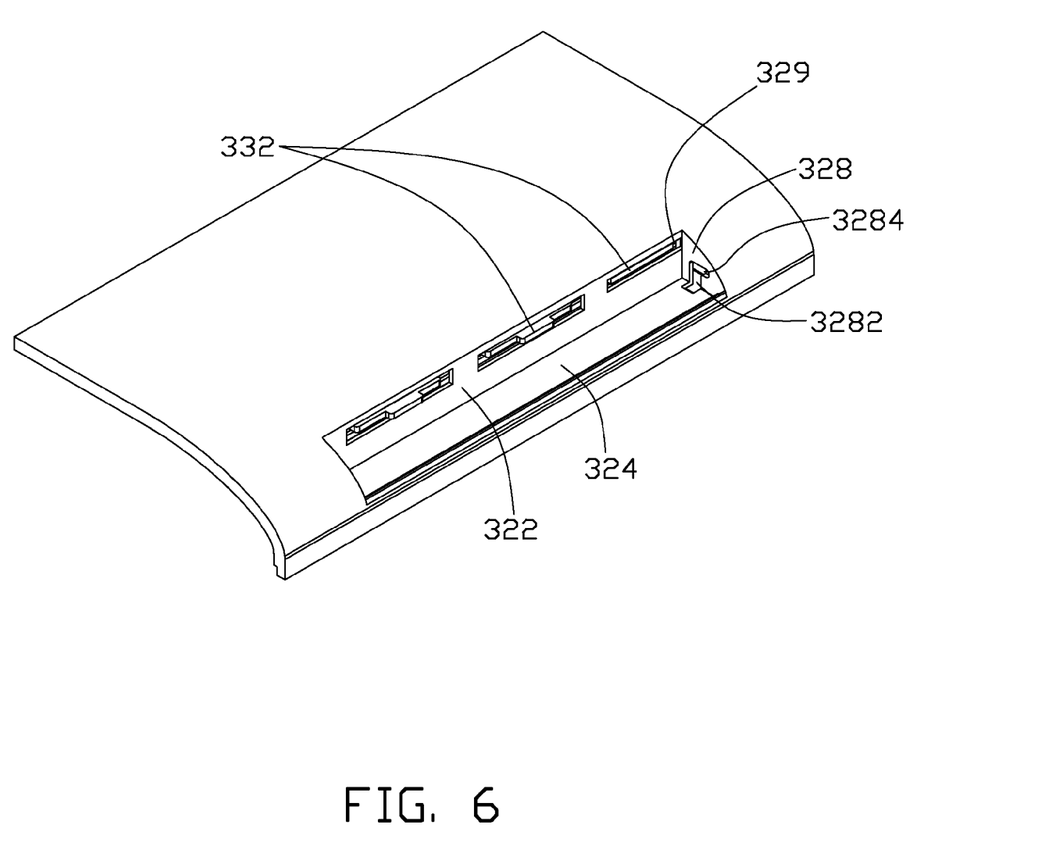
FIG. 6 is similar to FIG. 5, but viewed from another aspect.

The connector cover 50 includes a base plate 52, a rotation shaft 54, a pivot shaft 56, and a receiving portion 58. The base plate 52 is substantially rectangular and matches the first receiving portion 32. The rotation shaft 54 and the pivot shaft 56 extend from a plurality of central portions of two opposite ends of the base plate 52. The receiving portion 58 is formed at an end of the pivot shaft 56 away from the base plate 52. In the illustrated embodiment, the receiving portion 58 is substantially cylindrical, and the diameter of the receiving portion 58 exceeds that of the pivot shaft 56. The receiving portion 58 forms a plurality of protrusions (not labeled) on an outer surface thereof to increase the surface roughness of the receiving portion 58.

The resisting member 70 is substantially a rectangular block, capable of being received in the second receiving portion 34. The resisting member 70 defines a receiving groove 72 depressed from an end surface of the resisting member 70. The resisting member 70 forms a contact surface 74 at an opposite end thereof. The contact surface 74 is arcuate.

The resilient member 90 is partly receivable in the receiving groove 72. In the illustrated embodiment, the resilient member 90 is a spring.

In the assembly of the electronic device 100, an end of the resilient member 90 is received in the receiving groove 72 and an opposite end of the resilient member 90 extends out from the end surface of the resisting member 70. The resilient member 90 and the resisting member 70 are received in the second receiving portion 34 with the end of the resilient member 90 to be extending from the resisting member 70 and resisting the first plate 342. The end of the resisting member 70 away from the resilient member 90 corresponds to the pivot hole 3284. The rotation shaft 54 is received in the shaft hole 3262. The pivot shaft 56 is received in the pivot hole 3284 through the notch 3282. The receiving portion 58 is received in the second receiving portion 34, and resists the contact surface 74, and the resilient member 90 is compressed.

Figure 7:
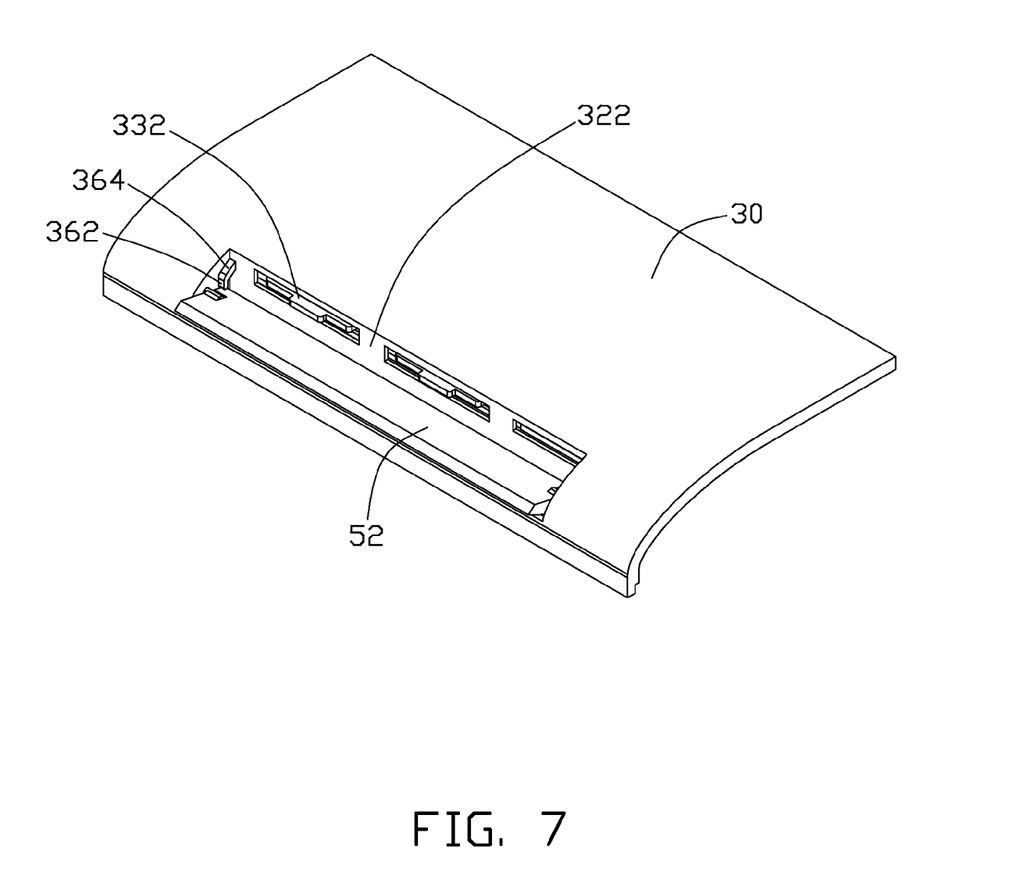
FIG. 7 is similar to FIG. 2, but viewed from another aspect and showing the connector cover opened.

Referring also to FIG. 7, when the connector 332 is to be used, an external force applied on an end of the connector cover 50 adjacent to the second sidewall 324 rotates the connector cover 50 relative to the enclosure 10 until the base plate 52 abuts the end of the first restricting portion 362 adjacent to the second sidewall 324, and the connector 332 is exposed. The resisting member 70 elastically resists the receiving portion 58 of the connector cover 50 to keep the connector cover 50 open.

When the connector 332 is not in use, an external force applied on an end of the connector cover 50 away from the first sidewall 322 rotates the connector cover 50 relative to the enclosure 10 until the base plate 52 is abutting the restricting surface 3642, and the connector cover 50 covers the first receiving portion 32. The resisting member 70 elastically resists the receiving portion 58 of the connector cover 50 to keep the connector cover 50 closed.

When the connector 332 is in use, the connector cover 50 is rotated rather than being removed from the electronic device 100, thereby avoiding loss or misplacement thereof, and retaining protection of the connector 332.

The resilient member 90 resists the receiving portion 58 of the connector cover 50, such that the resistance while the connector cover 50 rotates is increased, and the connector cover 50 remains closed or opened relative to the first receiving portion 32.

The rotation shaft 54 and the pivot shaft 56 are located in the central portions of the two opposite ends of the base plate 52, such that when the connector 332 is in use, the connector 332 is at least partially received in the first receiving portion 32, and the electronic device 100 thus occupies less space, and the connector cover 50 is well protected.

The restricting member 36 may be omitted, whereby the rotation of the connector cover 50 is stopped as long as the connector 332 is exposed. The cover 30 may be omitted, as long as the enclosure 10 is molded as a whole. The receiving portion 58 of the connector cover 50 may be omitted, whereby the pivot shaft 56 resists the resisting member 70. The resilient member 90 may be omitted, whereby the resisting member 70 is made of elastic materials. The first receiving portion 32 may be omitted, whereby the connector cover 50 is rotatably connected to the enclosure 10, such as the enclosure 10 forms two protrusions positioned at two opposite ends of the opening 329, and each protrusion defines a shaft hole in which one of the rotation shaft 54 and the pivot shaft 56 is received.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
    an enclosure defining at least one opening;
    a connector disposed in the enclosure and corresponding to the at least one opening of the enclosure;
    a connector cover covering the at least one opening to protect the connector;
    a resisting member mounted on the enclosure adjacent to the at least one opening, the resisting member comprising a block, and a receiving groove being defined in one end of the block; and
    a resilient member partly received in the receiving groove of the block, wherein the connector cover comprises a pivot shaft and a receiving portion fixed to a free end of the pivot shaft, the pivot shaft is rotatably connected to the enclosure, one end of the resilient member protruding out from the receiving groove resists against the enclosure, and the other end of the block resists against the receiving portion due to the resilient member being compressed.

2. The electronic device of claim 1, wherein the enclosure comprise a first receiving portion depressed from the enclosure, the at least one opening is defined in the first receiving portion, and the connector cover covers the first receiving portion.

3. The electronic device of claim 1, wherein the connector cover further comprises a base plate and a rotation shaft, the rotation shaft and the pivot shaft extends from two opposite ends of the base plate, and the rotation shaft is rotatably connected to the enclosure.

4. The electronic device of claim 1, wherein the receiving portion forms a plurality of protrusions on an outer surface of the receiving portion resisting against the resisting member.

5. The electronic device of claim 3, wherein the rotation shaft and the pivot shaft extend from a plurality of substantially central portions of two opposite ends of the base plate.

6. The electronic device of claim 2, further comprising a restricting member, wherein the restricting member is positioned inside the first receiving portion, the restricting member comprises a first restricting portion and a second restricting portion, when the connector cover is open relative to the first receiving portion, the connector cover is at least partly received in the first receiving portion and abuts the first restricting portion, and when the connector cover covers the first receiving portion, the connector cover abuts the second restricting portion.

7. The electronic device of claim 2, wherein the enclosure further defines a second receiving portion at a side of the first receiving portion corresponding to the pivot shaft, the block of the resisting member and the resilient member are received in the second receiving portion, and the one end of the resilient member protruding out from the receiving groove resists against the second receiving portion.

8. The electronic device of claim 7, wherein the second receiving portion defines a shaft hole communicating between the first receiving portion and the second receiving portion, and the pivot shaft is received in the shaft hole.

9. The electronic device of claim 4, wherein the block of the resisting member comprises a contact surface, and the contact surface is an arcuate surface, and resists against the outer surface of the receiving portion.

10. An electronic device, comprising:
    an enclosure defining at least one opening;
    a connector cover covering the at least one opening;
    a resisting member mounted on the enclosure adjacent to the at least one opening, the resisting member comprising a block, and a receiving groove being defined in one end of the block; and
    a resilient member partly received in the receiving groove of the block, wherein the connector cover comprises at least one pivot shaft and a receiving portion fixed to a free end of the at least one pivot shaft, the at least one pivot shaft is rotatably connected to the enclosure, one end of the resilient member protruding out from the receiving groove resists against the enclosure, and the other end of the block resists against the receiving portion due to the resilient member being compressed.

11. An electronic device, comprising:

an enclosure defining an opening and comprising a receiving portion adjacent to the opening, wherein the receiving portion is positioned inside of the enclosure and substantially U-shaped;

a connector cover covering the opening and comprising at least one pivot shaft and a receiving portion fixed to a free end of the at least one pivot shaft;

a resisting member mounted in the receiving portion of the enclosure adjacent to the opening, the resisting member comprising a block, and a receiving groove being defined in one end of the block; and a resilient member partly received in the receiving groove of the block, wherein the at least one pivot shaft is rotatably connected to the enclosure, one end of the resilient member protruding out from the receiving groove resists against the receiving portion of the enclosure, and the other end of the block elastically resists against the receiving portion of the connector cover due to the resilient member being compressed.

* * * * *